(12) United States Patent
Noh et al.

(10) Patent No.: US 10,637,701 B2
(45) Date of Patent: Apr. 28, 2020

(54) METHOD AND APPARATUS FOR TRANSMITTING PHYSICAL UPLINK CONTROL CHANNEL

(71) Applicant: Electronics and Telecommunications Research Institute, Daejeon (KR)

(72) Inventors: Taegyun Noh, Daejeon (KR); Kwang Jae Lim, Daejeon (KR); Chul Sik Yoon, Daejeon (KR); Yu Ro Lee, Daejeon (KR); Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 507 days.

(21) Appl. No.: 15/173,074

(22) Filed: Jun. 3, 2016

(65) Prior Publication Data

US 2016/0360518 A1    Dec. 8, 2016

(30) Foreign Application Priority Data

Jun. 4, 2015   (KR) ......................... 10-2015-0079433
Oct. 30, 2015  (KR) ......................... 10-2015-0152572
Jun. 3, 2016   (KR) ......................... 10-2016-0069537

(51) Int. Cl.
    *H04W 72/04*   (2009.01)
    *H04L 27/26*   (2006.01)
    *H04L 5/00*    (2006.01)

(52) U.S. Cl.
    CPC ........ *H04L 27/2607* (2013.01); *H04L 5/0051* (2013.01); *H04L 5/0053* (2013.01); *H04L 5/0055* (2013.01)

(58) Field of Classification Search
    None
    See application file for complete search history.

(56) References Cited

U.S. PATENT DOCUMENTS

| 2009/0034505 | A1  | 2/2009  | Papasakellariou et al. |
| 2012/0163365 | A1  | 6/2012  | Papasakellariou et al. |
| 2013/0107819 | A1  | 5/2013  | Noh et al. |
| 2014/0105189 | A1  | 4/2014  | Papasakellariou et al. |
| 2014/0241188 | A1  | 8/2014  | Park et al. |
| 2015/0282158 | A1* | 10/2015 | Chen ................... H04L 5/0007 370/329 |
| 2016/0044645 | A1  | 2/2016  | Noh et al. |
| 2016/0295574 | A1* | 10/2016 | Papasakellariou .. H04W 52/146 |

FOREIGN PATENT DOCUMENTS

| KR | 1020140083945 A | 7/2014 |
| KR | 1020140108427 A | 9/2014 |
| KR | 1014919640000 B1 | 2/2015 |

OTHER PUBLICATIONS

"Evolved Universal Terrestrial Radio Access (E-UTRA); Physical channels and modulation," 3GPP TS 36.211, Mar. 2015, pp. 1-136, V12.5.0.

* cited by examiner

*Primary Examiner* — Noel R Beharry
*Assistant Examiner* — Pamit Kaur
(74) *Attorney, Agent, or Firm* — William Park & Associates Ltd.

(57) ABSTRACT

A method and an apparatus for transmitting the physical uplink control channel including an uplink control channel expressed by product of a uplink control information and a sequence and demodulation reference signal expressed by a sequence having different cyclic shift values through a short resource block are provided.

19 Claims, 5 Drawing Sheets

METHOD AND APPARATUS FOR TRANSMITTING PHYSICAL UPLINK CONTROL CHANNEL

CROSS-REFERENCE TO RELATED APPLICATION

This application claims priority to and the benefit of Korean Patent Applications Nos. 10-2015-0079433, 10-2015-0152572, and 10-2016-0069537 filed in the Korean Intellectual Property Office on Jun. 4, 2015, Oct. 30, 2015, and Jun. 3, 2016, the entire contents of which are incorporated herein by reference.

BACKGROUND OF THE INVENTION (a) Field of the Invention

The present specification relates to a method and apparatus for transmitting a physical uplink control channel in a wireless communication system.

(b) Description of the Related Art

A physical uplink control channel is used for transmitting an uplink (UL) ACK/NACK, a scheduling request (SR) or channel state information (CSI), or combination thereof. The UL ACK/NACK is information indicating whether the demodulation for a physical downlink data channel is successful. The SR is a message used for sending a request of uplink resource allocation to a base station. The CSI is information indicating a state of a downlink wireless channel, and the base station may transmit a physical downlink control channel and the physical downlink data channel by performing a link adaption based on the CSI.

A format of the physical uplink control channel may vary according to information transmitted through the physical uplink control channel. In general, a physical uplink control channel format 1 is used for transmitting the SR and the UL ACK/NACK, or one of the SR or the UL ACK/NACK. A physical uplink control channel format 2 is used for transmitting the CSI.

SUMMARY OF THE INVENTION

According to an exemplary embodiment, a method for transmitting a physical uplink control channel is provided. The method includes: transmitting a first uplink control channel and a demodulation reference signal through a first symbol of two symbols included in a short resource block (sRB); and transmitting a second uplink control channel and a sounding reference signal (SRS) through a second symbol of the two symbols, wherein the first uplink control channel is a product of a first sequence and an uplink control information, the second uplink control channel is a product of a second sequence and the uplink control information, and the demodulation reference signal is a third sequence.

The third sequence may be a length 6 sequence, and the transmitting a first uplink control channel and a demodulation reference signal through a first symbol of two symbols included in a short resource block (sRB) may include transmitting the demodulation reference signal, which is deployed with two-subcarrier spacing, through 6 resource elements of a plurality of resource elements included in the first symbol of the sRB.

The first sequence may be a length 6 sequence, and the transmitting a first uplink control channel and a demodulation reference signal through a first symbol of two symbols included in a short resource block (sRB) may include transmitting the first uplink control channel, which is deployed with two-subcarrier spacing, through other resource elements except the 6 resource elements from the plurality of resource elements.

The first sequence and the third sequence may be the same sequence.

Cyclic shift values of the first sequence and the third sequence may be different from each other.

The cyclic shift values may be determined based on an index of the sRB, an index of a transmission time interval (TTI) which includes the sRB, and an index of a symbol in the TTI.

The method may further include receiving information about the cyclic shift value through system information or a radio resource control (RRC) signaling.

The first sequence may be a length 12 sequence, and the transmitting a second uplink control channel and an SRS through a second symbol of the two symbols may include transmitting the second uplink control channel through a plurality of resource elements included in the sRB when the second uplink control channel is transmitted.

The method may further include: transmitting a third uplink control channel in which a fourth sequence and the uplink control channel in which the block coding is applied are multiplied when the physical uplink control channel is a physical uplink control channel format 2.

According to another exemplary embodiment, an apparatus for transmitting a physical uplink control channel is provided. The apparatus includes at least one processor; a memory; and a radio frequency unit, wherein the at least one processor executes at least one program stored in the memory to perform transmitting a first uplink control channel and a demodulation reference signal through a first symbol of two symbols included in a short resource block (sRB); and transmitting a second uplink control channel and a sounding reference signal (SRS) through a second symbol of the two symbols, wherein the first uplink control channel is a product of a first sequence and an uplink control information, the second uplink control channel is a product of a second sequence and the uplink control information, and the demodulation reference signal is a third sequence.

The third sequence may be a length 6 sequence, and when transmitting a first uplink control channel and a demodulation reference signal through a first symbol of two symbols included in a short resource block (sRB), the at least one processor may perform transmitting the demodulation reference signal, which is deployed with two-subcarrier spacing, through 6 resource elements of a plurality of resource elements included in the first symbol of the sRB.

The first sequence may be a length 6 sequence, and when transmitting a first uplink control channel and a demodulation reference signal through a first symbol of two symbols included in a short resource block (sRB), the at least one processor may perform transmitting the first uplink control channel, which is deployed with two-subcarrier spacing, through other resource elements except the 6 resource elements from the plurality of resource elements.

The first sequence and the third sequence may be the same sequence.

The cyclic shift values of the first sequence and the third sequence are different from each other.

The cyclic shift value may be determined based on an index of the sRB, an index of a transmission time interval (TTI) which includes the sRB, and an index of a symbol in the TTI.

The at least one processor may further perform receiving information about the cyclic shift value through system information or a radio resource control (RRC) signaling.

The first sequence may be a length 12 sequence, and when transmitting a second uplink control channel and an SRS through a second symbol of the two symbols, the at least one processor may perform transmitting the second uplink control channel through a plurality of resource elements included in the sRB when the second uplink control channel is transmitted.

The at least one processor may further perform transmitting a third uplink control channel in which a fourth sequence and the uplink control channel in which the block coding is applied are multiplied when the physical uplink control channel is a physical uplink control channel format 2.

According to still another exemplary embodiment, a method for transmitting a physical uplink control channel is provided. The method includes transmitting a demodulation reference signal through predetermined resource elements of a plurality of resource elements included in a short resource block (sRB); and transmitting a uplink control channel through rest resource elements of the plurality of the resource elements included in the sRB, wherein each cyclic shift of the demodulation reference signal is different with the plurality of the resource elements.

The transmitting a demodulation reference signal through predetermined resource element of a plurality of resource elements included in a short resource block (sRB) may include transmitting through the predetermined resource elements which are deployed adjacently on the time-frequency domain.

DETAILED DESCRIPTION OF THE EMBODIMENTS

Hereinafter, exemplary embodiments will be described in detail with reference to the accompanying drawings so that those skilled in the art may easily practice the present invention. However, the present specification may be implemented in various different ways and is not limited to the exemplary embodiments provided in the present description. In the accompanying drawings, portions unrelated to the description will be omitted in order to obviously describe the present specification, and similar reference numerals will be used to describe similar portions throughout the present specification.

Throughout the specification, a terminal may refer to a mobile station (MS), a mobile terminal (MT), an advanced mobile station (AMS), a high reliability mobile station (HR-MS), a subscriber station (SS), a portable subscriber station (PSS), an access terminal (AT), a user equipment (UE), a machine type communication (MTC) device, and the like, and may include functions of all or some of the MT, MS, AMS, HR-MS, SS, PSS, AT, UE, and the like.

In addition, a base station (BS) may represent an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as the base station, a relay node (RN) serving as the base station, an advanced relay station (ARS) serving as the base station, a high reliability relay station (HR-RS) serving as the base station, a small base station [femto base station (BS), a home node B (HNB), a home eNodeB (HeNB), a pico BS, a macro BS, a micro BS, or the like], or the like, and may include all or some of the functions of the ABS, the nodeB, the eNodeB, the AP, the RAS, the BTS, the MMR-BS, the RS, the RN, the ARS, the HR-RS, the small base station, and the like.

A base station according to an exemplary embodiment of the present description may perform a function of a control device that controls one cell. A base station of a general wireless communication system may control a plurality of cells, and in this case, the base station may include a plurality of the base stations according to an exemplary embodiment of the present description. Therefore, a parameter that is allocated to each cell may be allocated to each cell as different values by the base station according to the exemplary embodiment of the present description.

Figure 1:
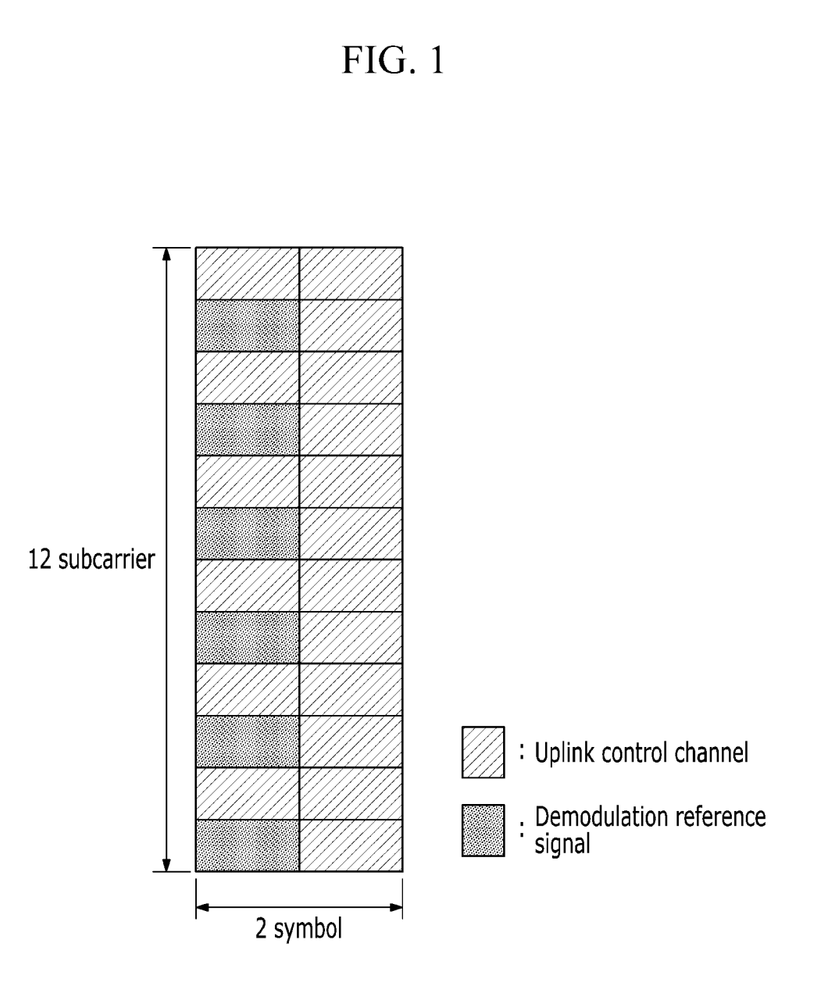
FIG. 1 shows a schematic diagram illustrating a physical uplink control channel format 1 or a physical uplink control channel format 2 according to an exemplary embodiment.

FIG. 1 shows a schematic diagram illustrating a physical uplink control channel format 1 or a physical uplink control channel format 2 according to an exemplary embodiment.

A physical uplink control channel format 1 may include a normal format and a shortened format. The physical uplink control channel of the normal format is transmitted over all of one transmission time interval (TTI), while the physical uplink control channel is transmitted through a portion of symbols included in the TTI in the shortened format. In this case, when the physical uplink control channel is transmitted through the portion of the symbols, a sounding reference signal (SRS) may be transmitted through the remainder of the symbols included in the TTI.

The normal format of the physical uplink control channel format 1 may be transmitted through one or more sRBs. According to the exemplary embodiment, the sRB includes two symbols on the time axis and 12 subcarriers on the frequency axis. Uplink control information transmitted in the normal format of the physical uplink control channel format 1 may be expressed as one complex symbol.

Referring to FIG. 1, the uplink control channel and the demodulation reference signal for an sRB are allocated in the normal format of the physical uplink control channel format 1. The demodulation reference signal and the uplink control channel are transmitted through a first symbol of the sRB, and the uplink control channel is only transmitted through a second symbol of the sRB. The demodulation reference signal is allocated in the first symbol of the two symbols included in the sRB, so that a channel estimation and demodulation are performed rapidly. The demodulation reference signal is a length 6 sequence, and may be transmitted through 6 resource element (RE). In this case, a time length of the RE is one symbol length, and a frequency length of the RE is one subcarrier length. As the demodulation reference signal is deployed with two-subcarrier spacing, the base station may improve the channel estimation performance by averaging a frequency selectivity based on the received demodulation reference signal.

The uplink control channel may include a product of the uplink control information and a sequence. For example, in the first symbol, the uplink control channel includes the product of one complex symbol indicating the uplink control information and a length 6 sequence, and the uplink control channel is transmitted through 6 resource elements. In this case, the sequence of the demodulation reference signal and the sequence applied to the uplink control channel may be the same sequence. Specifically, the same sequence is used for the demodulation reference signal and the uplink control channel, however a cyclic shift of each sequence may be different. In the second symbol, the uplink control channel may include the product of one complex symbol indicating the uplink control information and a length 12 sequence, and the uplink control channel may be transmitted through 12 resource elements.

According to the exemplary embodiment, a plurality of the physical uplink control channel format 1 may be multiplexed in one sRB. For the multiplexing of the physical uplink control channel, the cyclic shift value applied to each sequence of the physical uplink control channel format 1 may be different, respectively. In this case, the sequences of the physical uplink control channel format 1 include the length 6 sequence and the length 12 sequence applied to the uplink control channel. The cyclic shift value may exist up to 6 values. The base station may inform the terminal of information about the cyclic shift value (cyclic shift value or cyclic shift interval value) through a higher layer signaling. The higher layer signaling includes system information and a radio resource control (RRC) signaling. The system information may be transmitted to each cell, and the RRC signaling may be transmitted to each terminal. When the cyclic shift interval value is 1, 2 or 3, the number of the cyclic shift value is 6, 3 or 2, respectively. According to the exemplary embodiment, the number of the physical uplink control channel format 1 multiplexed in a sRB may be the same as the number of the cyclic shift values determined in accordance with the cyclic shift interval value.

Figure 2:
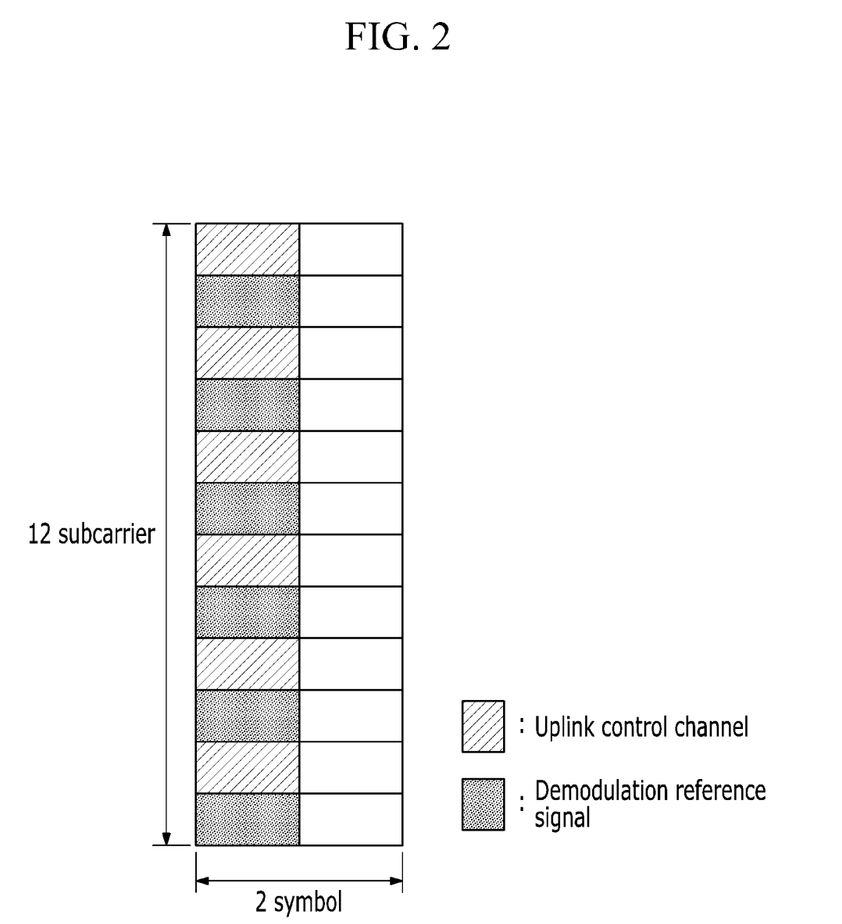
FIG. 2 shows a schematic diagram illustrating a shortened format of the physical uplink control channel format 1 according to an exemplary embodiment.

FIG. 2 shows a schematic diagram illustrating a shortened format of the physical uplink control channel format 1 according to an exemplary embodiment.

Referring to FIG. 2, the shortened format of the physical uplink control channel format 1 includes uplink control information and a demodulation reference signal for an sRB. The shortened format of the physical uplink control channel format 1 uses the first symbol of the normal format of the physical uplink control channel format 1 showed in FIG. 1. In the second symbol of the sRB, the SRS may be transmitted. A multiplexing method and a transmitting method of the demodulation reference signal is the same with the normal format of the physical uplink control channel format 1 showed in FIG. 1. In addition, a multiplexing method and a transmitting method of the uplink control channel is the same with the first symbol of the normal format of the physical uplink control channel format 1 showed in FIG. 1.

Figure 3:
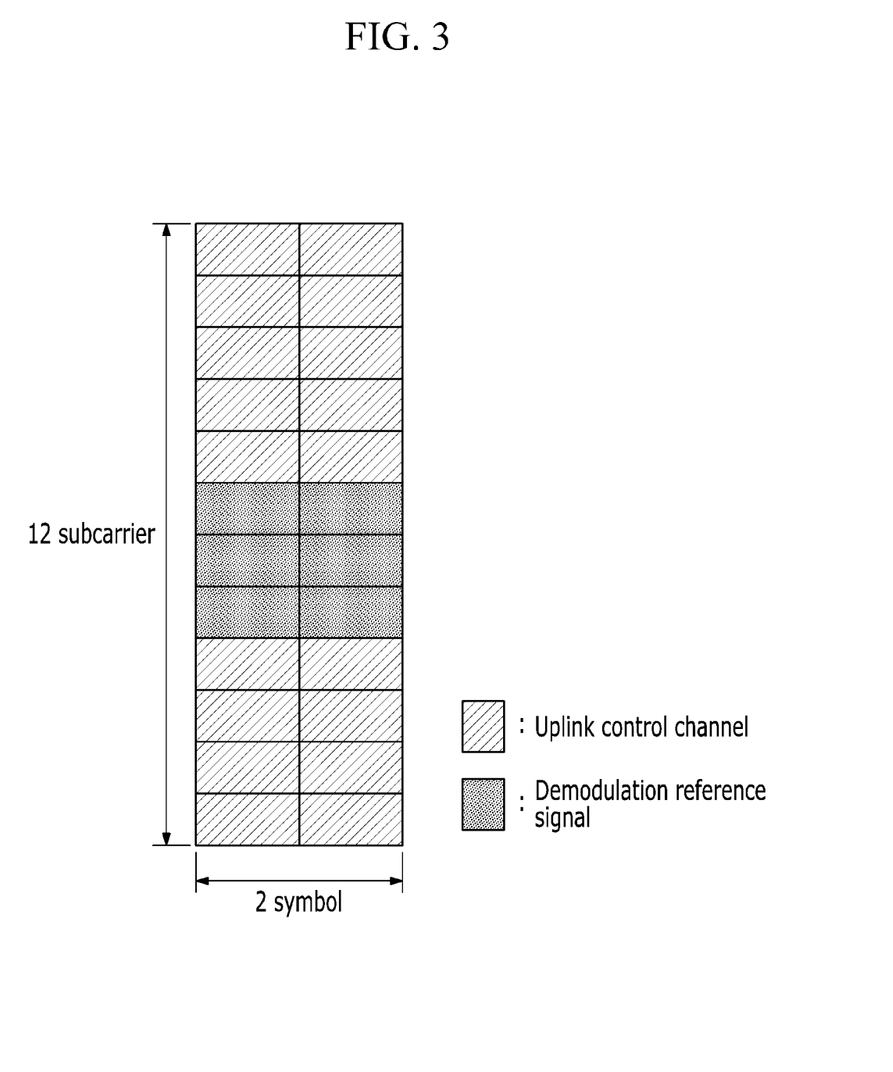
FIG. 3 shows a schematic diagram illustrating a physical uplink control channel format 1 or a physical uplink control channel format 2 according to another exemplary embodiment.
Figure 4:
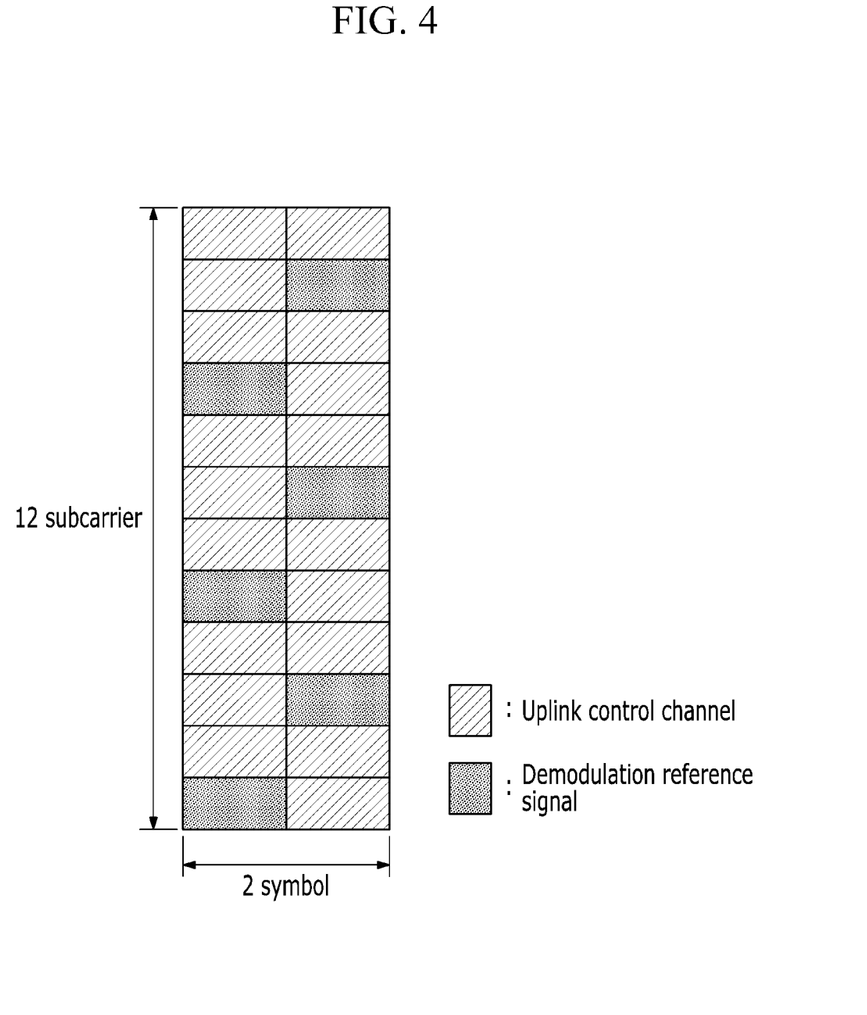
FIG. 4 shows a schematic diagram illustrating a physical uplink control channel format 1 or a physical uplink control channel format 2 according to still another exemplary embodiment.

FIG. 3 shows a schematic diagram illustrating a physical uplink control channel format 1 or a physical uplink control channel format 2 according to another exemplary embodiment, and FIG. 4 shows a schematic diagram illustrating a physical uplink control channel format 1 or a physical uplink control channel format 2 according to still another exemplary embodiment.

In FIG. 3 and FIG. 4, a demodulation reference signal and a uplink control channel may be transmitted in a first symbol and a second symbol of the sRB. In this case, the demodulation reference signal may be a length 6 sequence, and be transmitted through 6 resource elements. The uplink control channel may include a product of uplink control information and a sequence. Referring to FIG. 3 and FIG. 4, the uplink control channel includes the product of one complex symbol indicating the uplink control information and a length 9 sequence in the first symbol and the second symbol, and the uplink control channel may be transmitted through 9 resource elements. The same sequence (length 9) may be applied to the uplink control channel located in the first symbol and the uplink control channel located in the second symbol, however a cyclic shift value applied to each sequence may be different.

A plurality of the physical uplink control channel format 1 may be multiplexed in one sRB. For the multiplexing of the physical uplink control channel format 1, the cyclic shift value applied to each sequence of the physical uplink control channel format 1 may be different, respectively. In this case, the sequences of the physical uplink control channel format 1 include the length 6 sequence of the demodulation reference signal and the length 9 sequence for the uplink control channel. The cyclic shift value may exist up to 6 values. The base station may inform the terminal of the cyclic shift interval value through the higher layer signaling. The higher layer signaling includes the system information and the RRC signaling. The system information is transmitted to each cell, and the RRC signaling is transmitted to each terminal. The cyclic shift interval value may be 1, 2 or 3, in this case the number of available cyclic shift value is 6, 3 or 2, respectively. The number of the physical uplink control channel format 1 multiplexed in one sRB may be the same as the number of the cyclic shift values determined in accordance with the cyclic shift interval value.

Referring to FIG. 3, the resource elements in which the demodulation reference signal is transmitted are deployed adjacently at the minimum distance, however, referring to FIG. 4, the resource elements in which the demodulation reference signal is transmitted are deployed away at the maximum distance. A plurality of the demodulation reference signals transmitted in one sRB may have different cyclic shift value, respectively, it may mean code division multiplexing. The smaller the variation of the wireless channel in a resource element in which the demodulation reference signal is transmitted, each demodulation reference signal may be separated better. Therefore the demodulation reference signal showed in FIG. 3 may be more efficient in a wireless channel conditions in which the frequency selectivity is large. In contrast, the demodulation reference signal showed in FIG. 4 may be more efficient for improving the performance of the channel estimation by averaging the frequency selectivity in a wireless channel conditions in which the frequency selectivity is not large.

A time required for the channel estimation by using the demodulation reference signal in the exemplary embodiment showed in FIG. 1 is shorter than that of the exemplary embodiment showed in FIG. 3 or FIG. 4. Because the demodulation reference signal in the exemplary embodiment showed in FIG. 3 or FIG. 4 is transmitted through two symbols. In the light of demodulation of physical uplink channel, a gap to the demodulation performance for each symbol may occur because the length of the sequences applied to the first symbol and the second symbol are different from each other. However, in the exemplary embodiments of FIG. 3 and FIG. 4, a gap to the demodulation performance for each symbol may not be large because the length of the sequences applied to the first symbol and the second symbol are the same.

The physical uplink control channel format 1 may be transmitted through a plurality of the sRBs to improve the demodulation performance by using the frequency diversity. In this case, the demodulation reference signal and the uplink control channel included in each sRB may be deployed according to FIG. 1 to FIG. 4.

According to an exemplary embodiment, the physical uplink control channel format 1 may be transmitted through two sRBs that are away from each other on a frequency domain of the same TTI. The sRB in which the physical uplink control channel format 1 is transmitted is expressed in Equation 1.

$$n_{sRB} = \begin{cases} m & \text{if } m' = 0 \\ N_{sRB}^{UL} - 1 - m & \text{if } m' = 1 \end{cases} \quad \text{(Equation 1)}$$

In Equation 1, $n_{sRB}$ represents an index of an sRB, in which the physical uplink control channel format 1 is transmitted, in a system bandwidth of the uplink. m' represents an index of an sRB for distinguishing two sRBs in which the physical uplink control channel format 1 is transmitted. For example, when the m' is 0, the sRB in which the physical uplink control channel format 1 is transmitted is a first sRB, and when the m' is 1, the sRB in which the physical uplink control channel format 1 is transmitted is a second sRB. $N_{sRB}^{UL}$ represents the system bandwidth of the uplink. m in Equation 1 may be determined through Equation 2.

$$m = \left\lfloor \frac{n_{sPUCCH}^{(1,\tilde{p})}}{N_{seq,0}^{sPUCCH}/\Delta_{shift}^{sPUCCH}} \right\rfloor \quad \text{(Equation 2)}$$

In Equation 2, $n_{sPUCCH}^{(1,\tilde{p})}$ represents a resource index of the physical uplink control channel format 1, $N_{seq,0}^{sPUCCH}$ represents a length of a sequence applied to the physical uplink control channel format 1 deployed in the first symbol, and $\Delta_{shift}^{sPUCCH}$ represents the cyclic shift interval value of the sequence. Referring to Equation 1 and Equation 2, the physical uplink control channel format 1 may be transmitted through the two sRBs determined based on the $n_{sPUCCH}^{(1,\tilde{p})}$.

The cyclic shift applied to the uplink control channel for mitigating interference between a plurality of the physical uplink control channel format 1 may differ according to an index of the TTI, m', and an index of a symbol included in the TTI. According to an exemplary embodiment, the cyclic shift may be determined based on Equation 3.

$$\alpha_{\tilde{p}}(n_{ss},m',l)=2\pi \cdot n_{cs}^{(\tilde{p})}(n_{ss},m',l)/N_{seq,l}^{sPUCCH} \quad \text{(Equation 3)}$$

In Equation 3, $\alpha_{\tilde{p}}(n_{ss},m',l)$ represents a cyclic shift applied to the uplink control channel and is a function of $n_{ss}$ that is an index of the TTI, m', and l that is an index of a symbol included in the TTI. $N_{seq,l}^{sPUCCH}$ represents a length of a sequence applied to l-th symbol of the uplink control channel. Specifically, $n_{cs}^{(\tilde{p})}(n_{ss},m',l)$ used for determining $\alpha_{\tilde{p}}(n_{ss},m',l)$ may be determined based on Equation 4.

$$n_{cs}^{(\tilde{p})}(n_{ss},m',l)=\{n_{cs}^{cell}(n_{ss},m',l)+(l+1)\cdot\Delta_{shift}^{sPUCCH}\cdot n'_{\tilde{p}}(m')\}\bmod N_{seq,l}^{sPUCCH} \quad \text{(Equation 4)}$$

Referring to Equation 4, $n_{cs}^{(\tilde{p})}(n_{ss},m',l)$ may be determined according to $n_{cs}^{cell}(n_{ss},m',l)$ and $n'_{\tilde{p}}(m')$, and $n_{cs}^{cell}(n_{ss},m',l)$ may be determined based on Equation 5.

$$n_{cs}^{cell}(n_{ss},m',l)=\Sigma_{i=0}^{7}c(8N_{sRB}^{sPUCCH} \cdot N_{symb}^{sUL} \cdot n_{ss} + 8N_{symb}^{sUL} \cdot m' + 8l + i) \cdot 2^{i} \quad \text{(Equation 5)}$$

In Equation 5, $N_{sRB}^{sPUCCH}$ represents a number of the sRBs in which the physical uplink control channel format 1 is transmitted, $N_{symb}^{sUL}$ represents a number of the symbols included in the TTI. A cyclic shift for each cell is a function of $n_{ss}$, m', and l, and may have a different value according to the value of $n_{ss}$, m', and l.

$n'_{\tilde{p}}(m')$ in Equation 4 represents a resource index in one sRB and may mitigate interference for each physical uplink control channel format 1 by being determined according to m'. Specifically, $n'_{\tilde{p}}(m')$ may be determined based on Equation 6.

$$n'_{\tilde{p}}(m') = \begin{cases} n_{sPUCCH}^{(1,\tilde{p})} \bmod (N_{seq,0}^{sPUCCH}/\Delta_{shift}^{sPUCCH}) & \text{if } m' = 0 \\ \{(n'_{\tilde{p}}(m'-1)+1) \cdot N_{seq,0}^{sPUCCH}/\Delta_{shift}^{sPUCCH}\} & \text{if } m' = 1 \\ \bmod(N_{seq,0}^{sPUCCH}/\Delta_{shift}^{sPUCCH}+1)-1 & \end{cases} \quad \text{(Equation 6)}$$

The physical uplink control channel format 2 may be transmitted through one sRB or a plurality of sRBs. In the physical uplink control channel format 2, the uplink control channel and the demodulation reference signal included in one sRB may be deployed according to FIG. 1. That is, the deployment of the uplink control channel and the demodulation reference signal may be used in the physical uplink control channel format 2 as well as the physical uplink control channel format 1.

In a first symbol of the sRB, the demodulation reference signal and the uplink control channel are transmitted, and only the uplink control channel is transmitted in the second symbol. The demodulation reference signal is deployed in the first symbol of the two symbols included in the TTI, so that the channel estimation and demodulation may be performed rapidly. The demodulation reference signal may be a length 6 sequence, and demodulation reference signal may be transmitted through a 6 resource elements. As the demodulation reference signal is deployed with two-subcarrier spacing, the performance of the channel estimation may be improved through the averaging the frequency selectivity.

In the physical uplink control channel format 2, a block coding scheme may be applied to the uplink control channel. For example, when the (36, A) block coding scheme is applied to the uplink control channel, A represents a number of bits of the uplink control channel and 36 represents that the number of coded bits after the block coding is 36 bits. When the coded bit is modulated by a quadrature phase shift keying (QPSK) scheme, the 36 coded bits may be modulated as 18 QPSK complex symbols. The modulated 18 complex symbols may be transmitted through the two symbols included in the sRB. The 6 complex symbols of the 18 complex symbols are transmitted through 6 resource elements included in the first symbol of the sRB. And the rest 12 complex symbols are transmitted through 12 resource elements included in the second symbol of the sRB.

In the physical uplink control channel format 2, the uplink control channel and the demodulation reference signal may be deployed in the sRB according to FIG. 3 and FIG. 4. The exemplary embodiment of FIG. 3 and FIG. 4 may be applied to the physical uplink control channel format 2 as well as the physical uplink control channel format 1.

The physical uplink control channel format 2 has a point of sameness for the exemplary embodiment of FIG. 3 and FIG. 4. The demodulation reference signal and the uplink control channel are transmitted via the first symbol and the second symbol. The demodulation reference signal is a length 6 sequence and is transmitted through 6 resource elements. A (18, A) block coding scheme may be applied to the uplink control information. 18 represents that the number of coded bits after the block coding is 18 bits, and A represents a number of bits of the uplink control channel. The coded bit is modulated by a quadrature phase shift keying (QPSK) scheme, the 18 coded bits may be modulated as 9 QPSK complex symbols. The modulated 9 complex symbols are transmitted through 9 resource elements included in the first symbol of the sRB. And the 9 complex symbols are transmitted through 9 resource elements included in the second symbol of the sRB. That is, each complex symbol may be transmitted twice in one sRB. Orthogonal cover codes (OCC) that are different each other are may be applied to the first symbol and the second symbol. For example, [1 1] and [1 −1] may be applied to the first symbol and the second symbol as the OCC, respectively. Therefore, the two physical uplink control channel format 2 may be multiplexed in a sRB by the OCCs. In addition, the different cyclic shift value is applied to the two physical uplink control channel format 2, so that the demodulation reference signal may be multiplexed.

The physical uplink control channel format 2 has a point of difference for the exemplary embodiment of FIG. 3 and FIG. 4. Referring to FIG. 3, the resource elements in which the demodulation reference signal is transmitted is deployed adjacently at the minimum distance on the time-frequency domain, however, referring to FIG. 4, the resource elements in which the demodulation reference signal is transmitted is deployed away at the maximum distance on the time-frequency domain. A plurality of the demodulation reference signals transmitted in one sRB may have different cyclic shift value, respectively, it may mean code division multiplexing. The smaller the variation of the wireless channel in a resource element in which the demodulation reference signal is transmitted, each demodulation reference signal may be separated better. Therefore the demodulation reference signal showed in FIG. 3 may be more efficient in a wireless channel conditions in which the frequency selectivity is large. In contrast, the demodulation reference signal showed in FIG. 4 may be more efficient for improving the performance of the channel estimation by averaging the frequency selectivity in a wireless channel conditions in which the frequency selectivity is not large.

The physical uplink control channel format 2 may be transmitted through a plurality of sRBs to enhance the demodulation performance based on the frequency diversity. The configuration of the demodulation reference signal and the uplink control channel in each sRB follow foregoing descriptions. According to an exemplary embodiment of the present description, the physical uplink control channel format 2 may be transmitted through two sRBs that are away from each other on a frequency domain of the same TTI.

As described above, the channel estimation and the demodulation are performed rapidly and the performance of the channel estimation is enhanced based on the demodulation reference signal transmitted through the short resource block. In addition, the demodulation reference signal and the uplink control channel are multiplexed in one resource block by varying the cyclic shift value of the sequence applied to the uplink control information and the demodulation reference signal.

Figure 5:
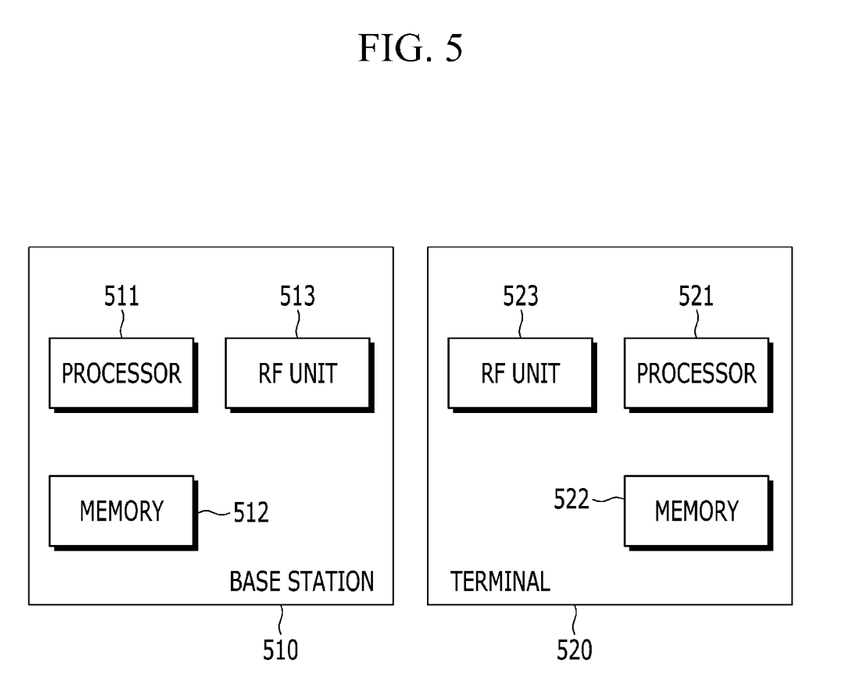
FIG. 5 shows a block diagram of a wireless communication system according to an exemplary embodiment.

FIG. 5 shows a block diagram of a wireless communication system according to an exemplary embodiment.

Referring to FIG. 5, the wireless communication system according to an exemplary embodiment includes a base station 510 and a terminal 520.

The base station 510 includes a processor 511, a memory 512, and a radio frequency (RF) unit 513. The memory 512 may be connected to the processor 511, and may store various kinds of information for driving the processor 511 or at least one program performed by the processor 511. The radio frequency unit 513 may be connected to the processor 511 and may transmit/receive a radio signal. The processor 511 may realize a function, a process, or a method proposed by an exemplary embodiment of the present invention. In this instance, in the wireless communication system according to an exemplary embodiment, a wireless interface protocol layer may be realized by the processor 511. An operation of the base station 510 according to an exemplary embodiment may be realized by the processor 511.

The terminal 520 includes a processor 521, a memory 522, and a radio frequency unit 523. The memory 522 may be connected to the processor 521, and may store various kinds of information for driving the processor 521 or at least one program performed by the processor 521. The radio frequency unit 523 may be connected to the processor 521 and may transmit/receive a radio signal. The processor 521 may realize a function, a process, or a method proposed by an exemplary embodiment of the present invention. In this instance, in the wireless communication system according to an exemplary embodiment, a wireless interface protocol layer may be realized by the processor 521. An operation of the terminal 520 according to an exemplary embodiment may be realized by the processor 521.

In an exemplary embodiment of the present invention, the memory may be provided inside or outside the processor, and the memory may be connected to the processor by using various means known to a person skilled in the art. The memory is a volatile or non-volatile storage medium in various formats, and for example, the memory may include a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a physical uplink control channel, comprising:

transmitting both a first uplink control channel and a demodulation reference signal through a first symbol of two symbols included in a short resource block (sRB) which has two consecutive symbols in the time dimension and is shorter than a resource block having seven symbols; and transmitting a second uplink control channel and a sounding reference signal (SRS) through a second symbol of the two symbols, wherein the first uplink control channel is a product of a first sequence and an uplink control information, the second uplink control channel is a product of a second sequence and the uplink control information, and the demodulation reference signal is a third sequence.

2. The method of claim 1, wherein the third sequence is a length 6 sequence, and the transmitting the first uplink control channel and the demodulation reference signal through the first symbol of two symbols included in the short resource block (sRB) includes transmitting the demodulation reference signal, which is deployed with two-subcarrier spacing, through 6 resource elements of a plurality of resource elements included in the first symbol of the sRB.

3. The method of claim 2, wherein the first sequence is a length 6 sequence, and the transmitting the first uplink control channel and the demodulation reference signal through the first symbol of two symbols included in the short resource block (sRB) includes transmitting the first uplink control channel, which is deployed with two-subcarrier spacing, through other resource elements except the 6 resource elements from the plurality of resource elements.

4. The method of claim 3, wherein the first sequence and the third sequence are the same sequence.

5. The method of claim 4, wherein cyclic shift values of the first sequence and the third sequence are different from each other.

6. The method of claim 5, wherein the cyclic shift values is determined based on an index of the sRB, an index of a transmission time interval (TTI) which includes the sRB, and an index of a symbol in the TTI.

7. The method of claim 5, further comprising:
receiving information about the cyclic shift values through system information or a radio resource control (RRC) signaling.

8. The method of claim 1, wherein the first sequence is a length 12 sequence, and the transmitting the second uplink control channel and the SRS through the second symbol of the two symbols includes transmitting the second uplink control channel through a plurality of resource elements included in the sRB when the second uplink control channel is transmitted.

9. The method of claim 1, further comprising:
transmitting a third uplink control channel in which a fourth sequence and the uplink control channel in which the block coding is applied are multiplied when the physical uplink control channel is a physical uplink control channel format 2.

10. An apparatus for transmitting a physical uplink control channel, comprising:
at least one processor;
a memory; and
a radio frequency unit,
wherein the at least one processor executes at least one program stored in the memory to perform
transmitting both a first uplink control channel and a demodulation reference signal through a first symbol of two symbols included in a short resource block (sRB) which has two consecutive symbols in the time dimension and is shorter than a resource block having seven symbols; and
transmitting a second uplink control channel and a sounding reference signal (SRS) through a second symbol of the two symbols,
wherein the first uplink control channel is a product of a first sequence and an uplink control information, the second uplink control channel is a product of a second sequence and the uplink control information, and the demodulation reference signal is a third sequence.

11. The apparatus of claim 10, wherein the third sequence is the length 6 sequence, and when transmitting the first uplink control channel and the demodulation reference signal through the first symbol of two symbols included in the short resource block (sRB), the at least one processor performs
transmitting the demodulation reference signal, which is deployed with two-subcarrier spacing, through 6 resource elements of a plurality of resource elements included in the first symbol of the sRB.

12. The apparatus of claim 11, wherein the first sequence is a length 6 sequence, and when transmitting the first uplink control channel and the demodulation reference signal through the first symbol of two symbols included in the short resource block (sRB), the at least one processor performs transmitting the first uplink control channel, which is deployed with two-subcarrier spacing, through other resource elements except the 6 resource elements from the plurality of resource elements.

13. The apparatus of claim 12, wherein the first sequence and the third sequence are the same sequence.

14. The apparatus of claim 13, wherein cyclic shift values of the first sequence and the third sequence are different from each other.

15. The apparatus of claim 14, wherein the cyclic shift values is determined based on an index of the sRB, an index of a transmission time interval (TTI) which includes the sRB, and an index of a symbol in the TTI.

16. The apparatus of claim 14, wherein the at least one processor further performs:
receiving information about the cyclic shift values through system information or a radio resource control (RRC) signaling.

17. The apparatus of claim 10, wherein the first sequence is a length 12 sequence, and when transmitting the second uplink control channel and the SRS through the second symbol of the two symbols, the at least one processor performs:
transmitting the second uplink control channel through a plurality of resource elements included in the sRB when the second uplink control channel is transmitted.

18. The apparatus of claim 10, wherein the at least one processor further performs:
transmitting a third uplink control channel in which a fourth sequence and the uplink control channel in which the block coding is applied are multiplied when the physical uplink control channel is a physical uplink control channel format 2.

19. A method for transmitting a physical uplink control channel, comprising:
transmitting both an uplink control channel and a demodulation reference signal through a short resource block (sRB) which has two consecutive symbols in the time dimension and is shorter than a resource block having seven symbols, wherein the uplink control channel is mapped to a first REs of the plurality of REs included in the sRB, the demodulation reference signal is mapped to a second REs of the plurality of REs, the first REs are different from the second REs, and each RE of the second REs is spaced apart from each other in the time dimension and a frequency dimension; and
transmitting a sounding reference signal (SRS) through remaining REs included in the sRB, wherein the remaining REs do not overlap with the first REs and the second REs through which the uplink control channel and the demodulation reference signal is are transmitted respectively,
wherein the uplink control channel is a product of a first sequence and an uplink control information and the demodulation reference signal is a second sequence.

* * * * *